(No Model.) 2 Sheets—Sheet 2.

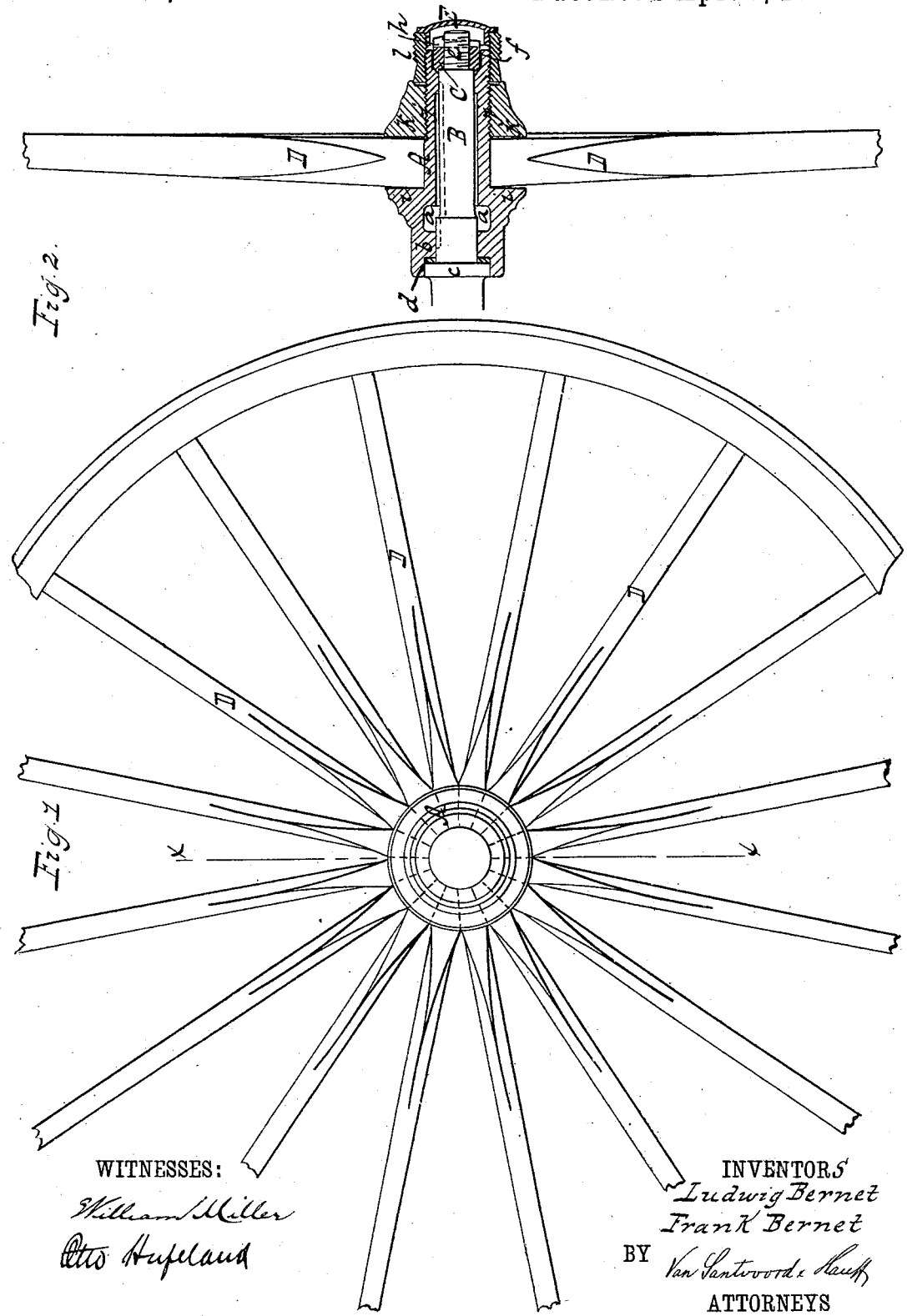

L. & F. BERNET.
VEHICLE WHEEL.

No. 275,120. Patented Apr. 3, 1883.

WITNESSES:
William Miller
Otto Hufeland

INVENTORS
Ludwig Bernet &
Frank Bernet
BY
Van Santvoord & Hauff
ATTORNEYS

UNITED STATES PATENT OFFICE.

LUDWIG BERNET AND FRANK BERNET, OF BINGEN, GERMANY.

VEHICLE-WHEEL.

SPECIFICATION forming part of Letters Patent No. 275,120, dated April 3, 1883.

Application filed February 13, 1883. (No model.) Patented in Germany November 30, 1882, No. 3,508.

*To all whom it may concern:*

Be it known that we, LUDWIG BERNET and FRANK BERNET, citizens of Germany, residing at Bingen on the Rhine, Germany, have invented new and useful Improvements in Wheels, of which the following is a specification.

This invention relates to a novel construction of the hub for wheels of wagons and other vehicles which combines the hub and the axle-box, and the peculiar and novel construction of which is pointed out in the following specification, and illustrated in the accompanying drawings, in which—

Figure 3:
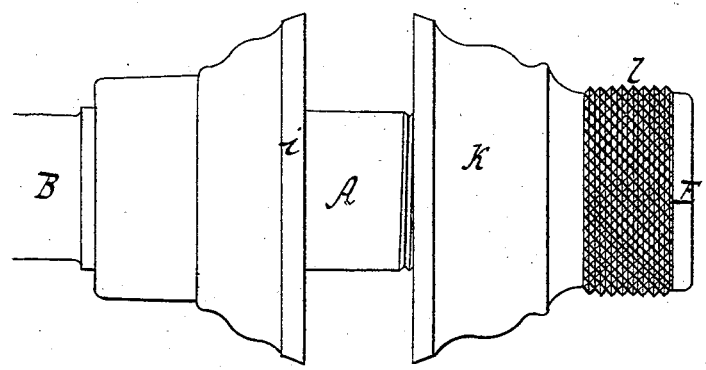
Figure 5:
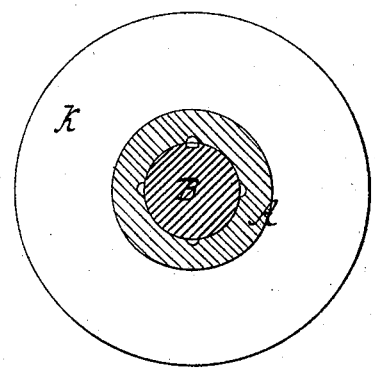
Figure 4:
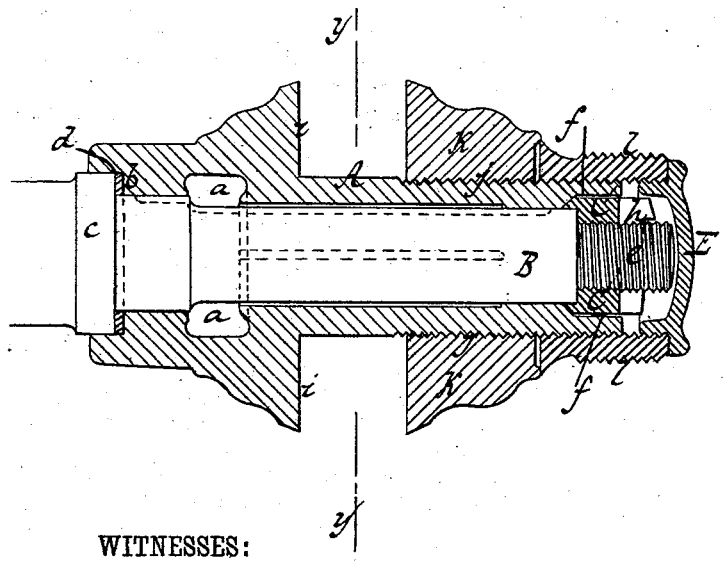
Figure 6:
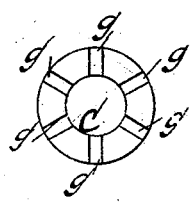

Figure 1 represents a face view of a wheel constructed according to our invention. Fig. 2 is a vertical section of the same in the plane $x\,x$, Fig. 1. Fig. 3 is a side elevation of the hub detached on a larger scale than the previous figures. Fig. 4 is a longitudinal section of the same. Fig. 5 is a transverse section in the plane $y\,y$, Fig. 4. Fig. 6 is a face view of the nut which retains the axle in the box.

Similar letters indicate corresponding parts.

In these drawings, the letter A designates the axle-box, which is provided with an oil-chamber, $a$, and with a shoulder, $b$, corresponding to the collar $c$ of the axle B. Between the collar $c$ and the shoulder $b$ is placed a washer, $d$, of leather or other suitable material. The front end of the axle is provided with a screw-nipple, $e$, on which is fitted the nut C, which enters a cavity, $f$, in the front end of the axle-box, and the inner edge of which is beveled to conform to the beveled bottom of the cavity $f$. Said nut C is provided in its face with a series of radiating grooves, $g$, (see Fig. 6,) and through the screw-nipple $e$ extends a slot for the reception of a key, $h$, which engages with two of the grooves $g$ of the nut and prevents the same from turning. When it is desired to tighten up the axle in its box the key is taken out and the nut C is turned round one-sixth, more or less, of a revolution, when it is again locked in position by inserting the key. When the axle-box is closed, as will be presently explained, the key is retained in its locking position and the nut C cannot unscrew.

On the rear portion of the axle-box A is formed a circular flange, $i$, and on its outer end is cut a screw-thread, $j$, on which are fitted the clamping-ring $k$ and the lock-nut $l$.

Between the ring $k$ and the flange $i$ are placed the inner ends of the spokes D, (see Figs. 1 and 2,) and when the clamping-ring is screwed up the spokes are firmly tightened, said clamping-ring being retained in the required position by the lock-nut $l$.

Into the open end of the lock-nut is fitted the screw-cap E, which serves to close the axle-box, and which projects inward far enough to retain the key $h$ in position. (See Fig. 4.)

By these means a wheel is obtained the spokes of which can be readily removed and reinserted, and the axle of which can be kept tight in its box, while the entrance of dust into the axle-box is effectually prevented.

What we claim as new, and desire to secure by Letters Patent, is—

1. The combination, substantially as hereinbefore described, of the axle-box A, the washer $b$, placed between the collar of the axle and the shoulder of the axle-box, the nut C, secured on the screw-nipple of the axle and fitting a cavity, $f$, in the outer end of the axle-box, the radial grooves $g$ in the face of the nut, and the key $h$.

2. The combination, substantially as hereinbefore described, of the axle-box A, the flange $i$, the clamping-ring $k$, the lock-nut $l$, the axle B, the nut C, the key $h$, and the screw-cap E for closing the axle-box and retaining the key $h$ in position.

In testimony whereof we have hereunto set our hands and seals in the presence of two subscribing witnesses.

LUDWIG BERNET. [L. S.]
FRANK BERNET. [L. S.]

Witnesses:
HERM. BRADLEY,
FRITZ BRADLEY.